United States Patent [19]
Inoue et al.

[11] Patent Number: 5,855,432
[45] Date of Patent: Jan. 5, 1999

[54] METHOD AND APPARATUS FOR ELIMINATING GEL CONTAINED IN POLYMER

[75] Inventors: Kimio Inoue; Kazuyoshi Imuta; Tsugushi Fukui; Hiroshi Ueda; Yoshinori Kuroda, all of Takasago, Japan

[73] Assignee: Kabushiki Kaisha Kobe Seiko Sho, Kobe, Japan

[21] Appl. No.: 648,760

[22] Filed: May 16, 1996

[51] Int. Cl.$^6$ ...................................................... B01F 7/08
[52] U.S. Cl. ............................ 366/322; 366/323; 366/88
[58] Field of Search .................................. 366/84, 79, 81, 366/82, 86, 88, 279, 291, 290, 292, 296, 297, 318, 322, 323; 425/205, 208, 209

[56] References Cited

U.S. PATENT DOCUMENTS

| | | | |
|---|---|---|---|
| 3,195,178 | 7/1965 | Carton et al. | 366/88 |
| 3,195,868 | 7/1965 | Loomans et al. | 366/291 |
| 3,565,403 | 2/1971 | Matsuoka | 366/84 |
| 3,608,868 | 9/1971 | Koch | 366/82 |
| 4,332,481 | 6/1982 | Inoue et al. | 366/84 |
| 4,534,652 | 8/1985 | Stade | 366/88 |
| 4,681,457 | 7/1987 | Orimo et al. | 366/84 |
| 5,217,303 | 6/1993 | Geyer | 366/88 |
| 5,499,870 | 3/1996 | Rockstedt | 366/88 |
| 5,590,959 | 1/1997 | Ueda et al. | 366/322 |

FOREIGN PATENT DOCUMENTS

| | | | |
|---|---|---|---|
| 61-242822 | 10/1986 | Japan | 366/79 |
| 108429 | 4/1996 | Japan . | |

OTHER PUBLICATIONS

Derwent Abstract of JP 8–108429 A, patent publication published on Apr. 30, 1996.

Primary Examiner—Tony G. Soohoo
Attorney, Agent, or Firm—Oblon, Spivak, McClelland, Maier & Neustadt, P.C.

[57] ABSTRACT

A method of eliminating gel contained in polymer, by efficiently plasticizing and melting the polymer supplied into a barrel with the stress in a rotor reduced, and next kneading the polymer with a rise in temperature of the polymer suppressed and a residence time of the polymer in the barrel increased. A continuous kneader for realizing this method is also provided. The gel eliminating method includes the first step of plasticizing and melting the polymer by using a first rotor having a given number of wings; and the second step of kneading the polymer after the first step by using a second rotor having a given number of wings fewer than the number of wings of the first rotor, so as to suppress a rise in temperature of the polymer and increase the volume of a kneading chamber to thereby increase a time period of residence of the polymer in the kneading chamber. The continuous kneader includes a rotor having the first rotor and the second rotor.

2 Claims, 3 Drawing Sheets

METHOD AND APPARATUS FOR ELIMINATING GEL CONTAINED IN POLYMER

BACKGROUND OF THE INVENTION

The present invention relates to a method of eliminating gel contained in polymer such as polyolefin by homogenizing and compounding the polymer, and also to a continuous kneader for realizing this method.

To eliminate gel contained in polymer such as polyolefin by homogenizing and compounding the polymer, the polymer is first charged from a hopper into a barrel provided with two rotors of various sectional shapes rotating in opposite directions to knead the polymer by rotation of the two rotors with a large shearing force, thereby plasticizing and melting the polymer as feeding.

FIGS. 6a and 6b are cross sections of rotor pairs having different sectional shapes in a continuous-type kneader used to knead the polymer. As shown in FIGS. 6a and 6b, the rotor pairs used in the continuous-type kneader are generally composed of triangular (three-wing) rotors and elliptic (two-wing) rotors. On the other hand, FIG. 7 in a cross section of a rotor pair in a batch-type kneader. As shown in FIG. 7, the rotor pair used in the batch-type kneader is generally composed of drop-shaped (one-wing) rotors.

FIG. 8 shows the operation of one of elliptic (two-wing) rotors in kneading polymer by rotating the rotors arranged in parallel. As shown in FIG. 8, a rotor 2 having two wings 3 is rotated in a direction of arrow P shown in FIG. 8 in a barrel 1 to apply a large shearing force to polymer as a stock to be kneaded in a wedge-shaped space 4 defined between the rotor 2 and the barrel 1, thereby plasticizing and melting the polymer. The polymer melted is repeatedly passed through a narrow clearance 5 defined between one of the wings 3 of the rotor 2 and the inner surface of the barrel 1, thereby homogenizing the polymer.

At this time, the tip of the wing 3 of the rotor 2 applies a large shearing force to the polymer, causing generation of a high pressure. Accordingly, the rotor 2 is subjected to a large force in a direction of arrow Q shown in FIG. 8 due to the high pressure, so that a bending stress due to this large force is applied to a shaft 6 of the rotor 2.

In a one-wing rotor, such a bending stress is always generated regardless of position of the wing. In a two-wing rotor, a bending stress generated by one of the two wings is canceled by a bending stress generated by the other wing. Accordingly, only when one of the two wings comes to a position at a communicating portion formed between adjacent barrel chambers, a bending stress is applied to a rotor shaft. In a three-wing rotor, one of the three wings is always present at the communicating portion, and receives reaction forces from the other two wings. However, these reaction forces are applied in such direction as to be canceled each other, so that a synthesized bending stress is small. Thus, the bending stress in a three-wing rotor is about ½ times that in a one-wing rotor or a two-wing rotor. For this reason, the use of a three-wing rotor is effective.

Further, since the tip of the wing applies a large shearing force to the polymer as mentioned above, a capability of dispersing aggregate of filler and gel in the polymer can be improved. Accordingly, it is general to use a two-wing rotor or a three-wing rotor in a conventional continuous kneader.

However, such a multi-wing rotor has a characteristic that a bending stress applied to the rotor is reduced and the amount of polymer passing through the clearances between the barrel and the tips of the wings is increased to thereby improve the dispersing performance; however, the work undergone by the polymer is increased to cause heat generation, resulting in a rise in temperature of the polymer. The rise in temperature of the polymer causes a decrease in viscosity of the polymer, so that the shearing action to the gel in the polymer cannot be effected and it is therefore difficult to eliminate the gel in the polymer.

Further, the multi-wing rotor has another characteristic that the volume occupied by the rotor in the barrel is increased to result in a decrease in volume of a kneading chamber defined between the barrel and the rotor, so that a time period of residence of the polymer in the kneading chamber is reduced. The reduction in such residence time of the polymer causes a problem that the polymer cannot be enough kneaded and it is therefore difficult to eliminate the gel in the polymer.

In this manner, the kneader used to eliminate the gel in the polymer is required to efficiently plasticize and melt the polymer just after supplied into the barrel and is also required to reduce the stress applied to the rotor. On the other hand, after plasticizing and melting the polymer, it is required to reduce the heat generation due to shearing by rotation of the rotor, thereby suppressing a temperature rise of the polymer, and is also required to increase the residence time of the polymer in the barrel. However, in the conventional continuous kneader, some rotor meets one of the above-mentioned required characteristics, but does not meet the other required characteristic, whereas the other rotor meets the other required characteristic, but does not meet the one required characteristic. Thus, a desired continuous kneader having rotors that meet both the required characteristics cannot be obtained in the related art.

SUMMARY OF THE INVENTION

It is accordingly an object of the present invention to provide a method of eliminating gel contained in polymer, by efficiently plasticizing and melting the polymer supplied into a barrel with the stress in a rotor reduced, and next kneading the polymer with a rise in temperature of the polymer suppressed and a residence time of the polymer in the barrel increased.

It is another object of the present invention to provide a continuous kneader for realizing the above method.

According to the present invention, there is provided a method of eliminating gel contained in polymer, comprising the first step of plasticizing and melting the polymer by using a first rotor having a given number of wings; and the second step of kneading the polymer after the first step by using a second rotor having a given number of wings fewer than the number of wings of the first rotor, so as to suppress a rise in temperature of the polymer and increase the volume of a kneading chamber to thereby increase a time period of residence of the polymer in the kneading chamber.

In this method, the polymer is efficiently plasticized and melted by the first rotor having a relatively large number of wings to reduce a bending stress applied to the first rotor. After being plasticized and melted, the polymer is kneaded by the second rotor having a relatively few number of wings to thereby reduce heat generation due to shearing, thereby suppressing a rise in temperature of the polymer, and also to increase the volume of a kneading chamber defined between the rotor and a barrel, thereby increasing a time period of residence of the polymer in the kneading chamber.

DETAILED DESCRIPTION OF THE PREFERRED EMBODIMENTS

Figure 1:
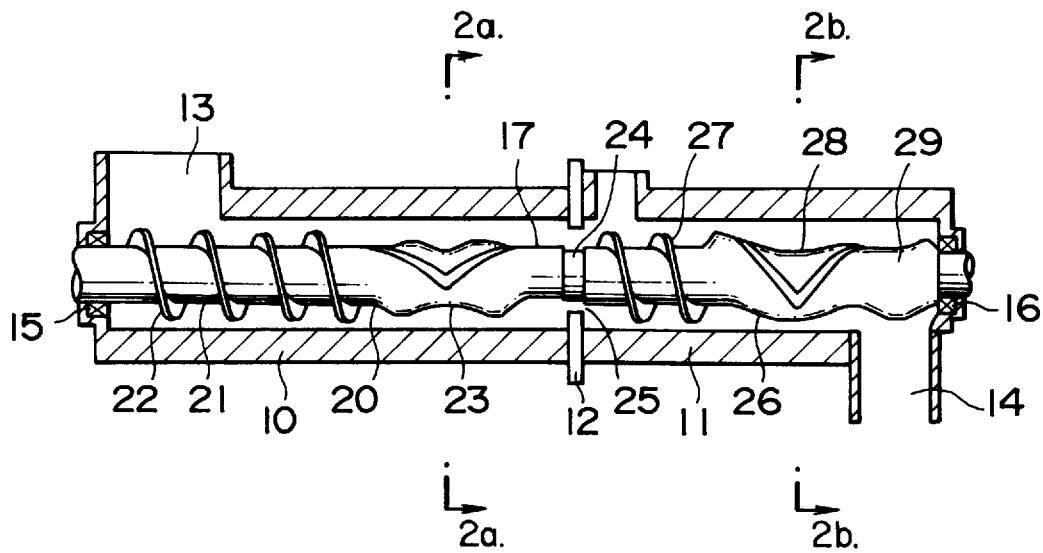
FIG. 1 is a partially sectional, side view showing the structure of a two-stage two-shaft continuous kneader according to a preferred embodiment of the present invention.
Figure 2A:
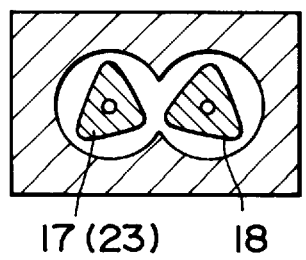
FIG. 2a is a cross section taken along the line A–A' in FIG. 1.
Figure 2B:
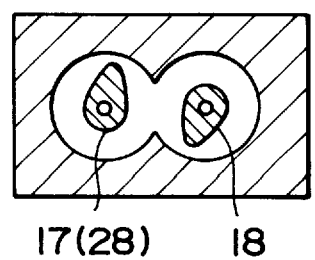
FIG. 2b is a cross section taken along the line B–B' in FIG. 1.

A preferred embodiment of the present invention will now be described with reference to the drawings. FIGS. 1, 2a, and 2b show a preferred embodiment of the present invention applied to a two-stage two-shaft continuous kneader. In this kneader, a first barrel 10 and a second barrel 11 are connected together in a coaxial fashion with flanges (not shown) having a central hole interposed therebetween. The first barrel 10 is provided with an inlet 13 for supplying polymer, and the second barrel 11 is provided with an outlet 14 for discharging the polymer after plasticized and melted. A gate 12 is provided for control of the polymer temperature in the first barrel.

In the first and second barrels 10 and 11, two rotors 17 and 18 are arranged in parallel to each other. Each of the rotors 17 and 18 is rotatably supported at both ends thereof by bearings 15 and 16 fixed to housings of the barrels 10 and 11. The rotors 17 and 18 are rotated in opposite directions at the same speed by an external driving device (not shown). The rotors 17 and 18 have the same shape, and are opposed to each other with their phases being shifted from each other. Accordingly, the same parts of the rotors 17 and 18 with respect to the shape or the like will be hereinafter described in only the rotor 17.

The rotor 17 is composed of two rotor sections 20 and 26 different in shape, the first rotor section 20 being located in the first barrel 10 and the second rotor section 26 being located in the second barrel 11. The first rotor section 20 has an introducing portion 21 formed with a screw 22. The screw 22 is followed by a rotor portion 23 having a triangular cross-section with three wings as shown in FIG. 2a. The polymer supplied from the inlet 13 is forced rightward as viewed in FIG. 1 by the screw 22, and plasticized and melted by the three-wing rotor portion 23 as being forced rightward as will be hereinafter described. Thereafter, the polymer is passed through a ringlike opening 25 defined between a rotor shaft 24 and the gate 12, and is forced into the second barrel 11.

The second rotor section 26 in the second barrel 11 has an introducing portion formed with a screw 27. The screw 27 is followed by a rotor portion 28 having a drop shape with one wing as shown in FIG. 2b. The one-wing rotor portion 28 functions to knead the plasticized and melted polymer supplied from the first barrel 10, thereby suppressing a rise in temperature of the polymer. Further, the one-wing rotor portion 28 functions also to ensure an increased volume of a kneading chamber, thereby increasing a residence time of the polymer in the kneading chamber. After being kneaded by the rotor portion 28, the polymer is discharged from the outlet 14. Each of the three-wing rotor portion 23 of the first rotor section 20 and the one-wing rotor portion 28 of the second rotor section 26 is twisted in such a manner that the direction of twist of a front half portion is opposite to the direction of twist of a rear half portion. The second rotor section 26 further has a rear end portion 29. The rear end portion 29 may be formed with another rotor portion different in shape from the rotor portion 28.

Figure 8:
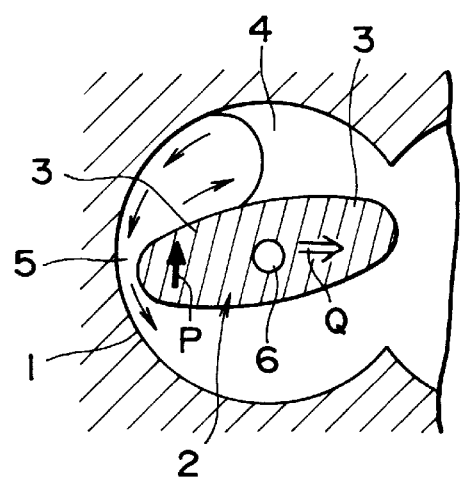
FIG. 8 is a fragmentary sectional view illustrating the operation of a rotor acting on resin in a barrel.

In operation, when the two rotors 17 and 18 are rotated in opposite directions and polymer is supplied from the inlet 13, the polymer is first kneaded and forced rightward as viewed in FIG. 1 to reach the screw-shaped three-wing rotor portion 23. As previously described with reference to FIG. 8, at the three-wing rotor portion 23, the polymer is subjected to a large shearing force, thus being plasticized and melted. Owing to the plural wings of the rotor portion 23, the strong shearing action to the polymer in a wedge-shaped space defined between the forwarding surface of the rotor portion and the inner surface of the barrel can be increased by the increased number of wings, thereby facilitating generation of heat and accordingly realizing efficient plasticizing and melting of the polymer. The rotor shaft is subjected to a bending stress through each wing upon generation of the shearing force, and one of the three wings of the three-wing rotor portion 23 is always present at a communicating portion defined between two adjacent barrel chambers, so that this wing is subjected to a bending stress due to reaction forces of the other two wings. However, these reaction forces act in such directions as to cancel each other, so that the synthesized bending stress applied to the rotor portion 23 is relatively small, and this bending stress is about ½ times the bending stress applied to a one-wing rotor or a two-wing rotor. Moreover, since the sectional area of the three-wing rotor portion 23 is relatively large, the strength of this portion required to apply a large shearing force to the polymer can be improved, and the bending stress to this portion can also be reduced.

After being plasticized and melted by the first rotor section 20 of the rotor 17, the polymer is forced into the second barrel 11 incorporating the second rotor section 26. Then, the polymer is further kneaded and fed by the screw 27, and is next further kneaded by the drop-shaped one-wing rotor portion 28. Owing to the one wing of the rotor portion 28, the shearing action is less and the generation of heat associated with this action is therefore less, so that a rise in temperature of the polymer can be prevented. Moreover, since the number of wings is reduced, the volume of the kneading chamber can be increased to thereby extend a residence time of the polymer, so that gel contained in the polymer can be dispersed. That is, the suppression of temperature rime of the polymer can prevent a decrease in viscosity of the polymer, thereby allowing the application of a shearing force to the polymer gel. Further, by maintaining the temperature of the polymer gel at its melting point or higher, the softening of the gel and the dispersing of the gel by the shearing action can be accelerated. Finally, the polymer with the gel dispersed to be eliminated is discharged from the outlet 14 to the next stage.

Figure 3:
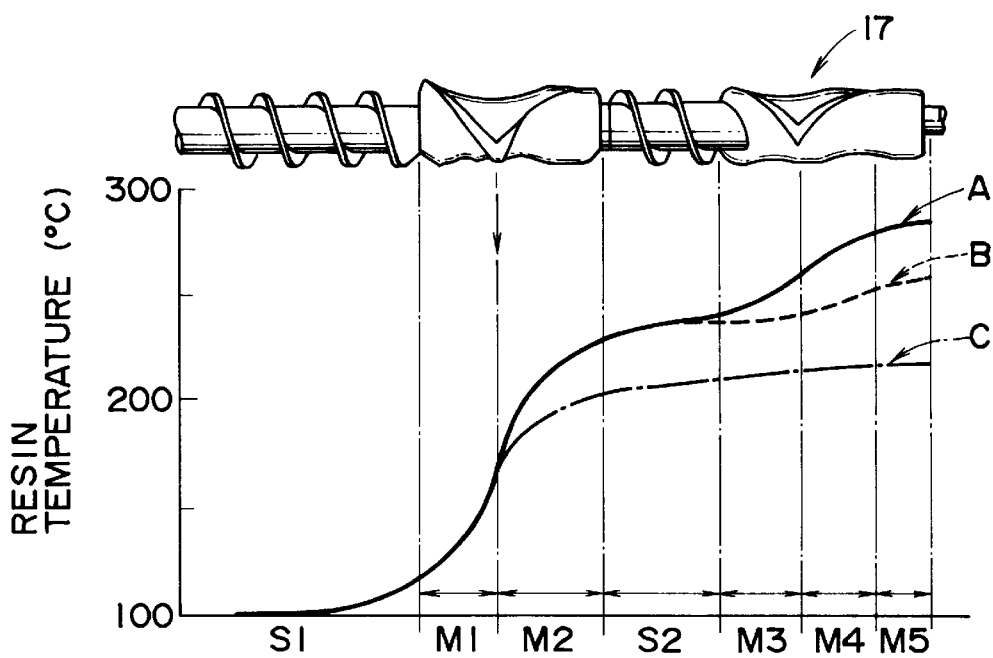
FIG. 3 is a graph showing the temperature characteristics of resin when the number of wings of a rotor in the preferred embodiment shown in FIG. 1 is changed.

FIG. 3 is a graph showing the measurement of temperatures of the polymer being kneaded at divided parts of the rotor 17. In FIG. 3, S1 and S2 correspond to the screw portions 22 and 27, respectively; M1 and M2 correspond to the front half portion and the rear half portion of the first rotor portion 23, respectively; M3 and M4 correspond to the front half portion and the rear half portion of the second rotor portion 28, respectively; and M5 corresponds to the rear end portion 29 of the second rotor section 26. Further, reference characters A, B, and C in FIG. 3 correspond to reference characters A, B, and C in Table 1, respectively, in which A represents a case where all the parts M1 to M5 are three-wing rotors; B represents a case where the parts M1 and M2 are three-wing rotors, and the parts M3 to M5 are two-ring rotors; and C represents a case where the part M1 is a three-wing rotor, the part M2 is a two-wing rotor, the parts M3 and M4 are one-wing rotors, and the part M5 is a two-wing rotor.

TABLE 1

The Number of Tips of Rotor

| Rotor | M1 | M2 | M3 | M4 | M5 |
|---|---|---|---|---|---|
| A | 3 | 3 | 3 | 3 | 3 |
| B | 3 | 3 | 2 | 2 | 2 |
| C | 3 | 2 | 1 | 1 | 2 |

As apparent from the graph shown in FIG. 3, the case A has a disadvantage that the resin temperature at the parts M3 to M5, especially, at the part M5, is excessively high; the case C has the optimal characteristic; and the case B has an intermediate characteristic between the cases A and C. To totally evaluate these cases A, B, and C having different rotor shapes, the resin temperature (°C.) and the number of gels in the polymer at the discharge portion were measured at a rotor revolving speed of 400 rpm under two kinds of conditions of outputs of 300 kg/h and 400 kg/h. The results of this measurement and total evaluation are shown in Table 2. As apparent from Table 2, the case C is excellent, and the case B is acceptable.

TABLE 2

Characteristics According To Rotor Shape (Rotor Speed 400rpm)

| Rotor | Output (Kg/h) | Resin Temperature (°C.) | The number of Gels in Polymer | Evaluation |
|---|---|---|---|---|
| A | 300 | 275 | Large | X |
|   | 400 | 260 | Large | X |
| B | 300 | 250 | Slightly large | Δ |
|   | 400 | 242 | Slightly large | Δ |
| C | 300 | 215 | Slightly large | ○ |
|   | 400 | 202 | Small | ○ |

Figure 4:
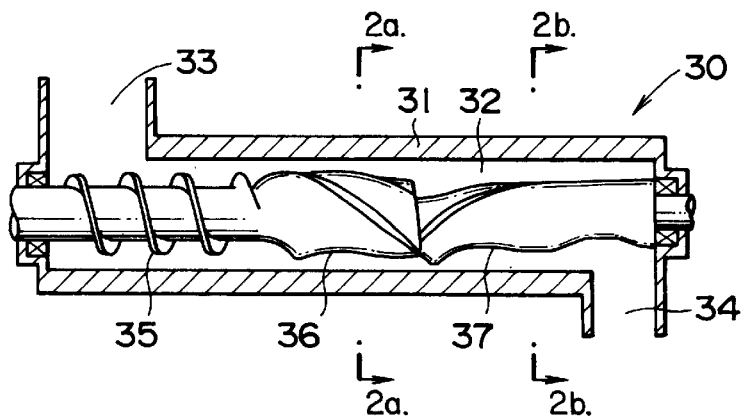
FIG. 4 is a partially sectional, side view of a one-stage two-shaft continuous kneader according to another preferred embodiment of the present invention.
Figure 5A:
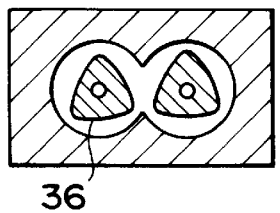
FIG. 5a is a cross section taken along the line A–A' in FIG. 4.
Figure 5B:
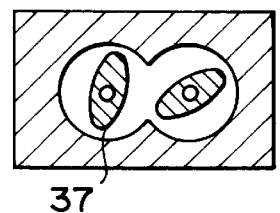
FIG. 5b is a cross section taken along the line B–B' in FIG. 4.
Figure 6A:
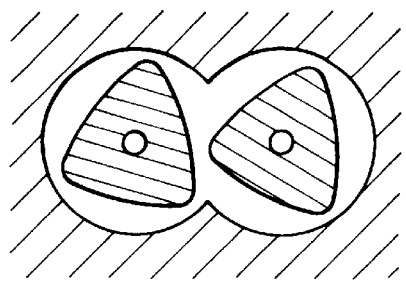
FIGS. 6a and 6b are cross sections of various rotor pairs of a continuous-type kneader in the related art.
Figure 6B:
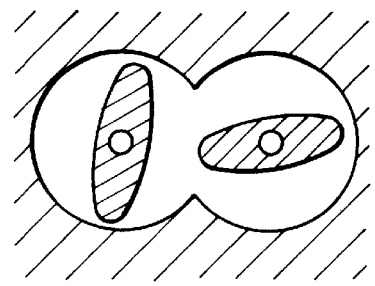
Figure 7:
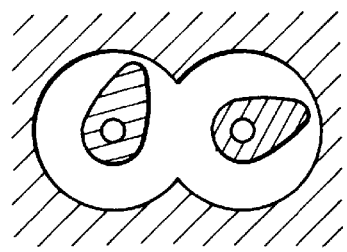
FIG. 7 is a cross section of a rotor pair of a batch-type kneader in the related art.

While the present invention is applied to the two-stage two-shaft continuous kneader in the above preferred embodiment, the present invention may be applied to a one-stage two-shaft continuous kneader 30 as shown in FIGS. 4, 5a, and 5b. The one-stage two-shaft continuous kneader 30 includes a single barrel 31 having an inlet 33 and an outlet 34, and a pair of parallel rotors 32 rotatably supported within the barrel 31. Each rotor 32 includes a screw portion 35, a first rotor portion 36, and a second rotor portion 37 formed integrally with a rotor shaft and arranged continuously from the inlet 33 to the outlet 34. The first rotor portion 36 is formed as a three-wing rotor as shown in FIG. 5a, and the second rotor portion 37 is formed as a two-wing rotor. The operation and effect of the one-stage two-shaft continuous kneader 30 are substantially similar to those of the two-stage two-shaft continuous kneader in the previous preferred embodiment.

As mentioned above, the first rotor portion 36 and the second rotor portion 37 of the rotor 32 are different in shape from each other. Further, the kneading characteristics of the rotor may be arbitrarily changed by changing the shape or the number of wings of the rotor portions. Accordingly, to allow easy selection of arbitrary rotor portions as required, the rotor shaft and the rotor portions may be formed as independent members. In this case, a spline may be formed on the outer circumference of the rotor shaft, and a spline adapted to engage the spline of the rotor shaft may be formed on the inner circumferential surface of each rotor portion having a central hole, whereby various rotor portions preliminarily formed can be arbitrarily changed as required.

More preferably, the one-stage two-shaft continuous kneader may be formed to include a three-wing rotor portion as the first rotor portion 36 and a one-wing rotor portion as the second rotor portion 37, because the polymer is required to be plasticized and melted as efficiently as possible by accelerating the shearing operation at the first rotor portion 36, and the generation of heat due to shearing is required to be reduced to minimize a temperature rise with the volume of the kneading chamber increased at the second rotor portion 37. In the case that the kneader is of a one-stage type, the structure can be made simpler. In the case that the kneader is of a two-stage type, the homogenizing and compounding of polymer can be more efficiently performed by using the kneader having a proper performance according to the kind of the polymer.

What is claimed is:

1. A continuous kneader comprising:

a barrel having a kneading chamber, one end formed with an inlet for supplying polymer and another end formed with an outlet for discharging said polymer which has been kneaded; and a rotor provided in said barrel for kneading said polymer supplied from said inlet, said rotor comprising a first rotor portion having a plural number of wings for plasticizing and melting said polymer, and a second rotor portion having a single wing for subsequently kneading said polymer, wherein the polymer is plasticized and melted with a reduced generation of heat and wherein the volume of the kneading chamber is increased.

2. A continuous kneader comprising:

a barrel having a kneading chamber, one end formed with an inlet for supplying polymer and another end formed with an outlet for discharging the polymer which has been kneaded; and two rotors provided in said barrel and rotating in opposite directions for kneading the polymer supplied from said inlet, each of said rotors comprising a first rotor portion having a plural number of wings for plasticizing and melting the polymer, and a second rotor portion having a single wing for subsequently kneading the polymer, wherein the polymer is plasticized and melted with a reduced generation of heat and wherein the volume of the kneading chamber is increased.

* * * * *